US012025746B2

United States Patent
Fujiwara et al.

(10) Patent No.: US 12,025,746 B2
(45) Date of Patent: Jul. 2, 2024

(54) LIGHT DETECTION DEVICE, LIGHT DETECTION METHOD, AND LIDAR DEVICE

(71) Applicant: OMRON Corporation, Kyoto (JP)

(72) Inventors: Naoki Fujiwara, Takatsuki (JP); Yuki Matsui, Kyoto (JP); Kazuo Yamamoto, Nara (JP)

(73) Assignee: OMRON CORPORATION, Kyoto (JP)

( * ) Notice: Subject to any disclaimer, the term of this patent is extended or adjusted under 35 U.S.C. 154(b) by 850 days.

(21) Appl. No.: 16/975,560

(22) PCT Filed: Mar. 1, 2019

(86) PCT No.: PCT/JP2019/008021
§ 371 (c)(1),
(2) Date: Aug. 25, 2020

(87) PCT Pub. No.: WO2019/176583
PCT Pub. Date: Sep. 19, 2019

(65) Prior Publication Data
US 2020/0400791 A1     Dec. 24, 2020

(30) Foreign Application Priority Data

Mar. 13, 2018   (JP) ................. 2018-045770

(51) Int. Cl.
*G01S 7/4861*     (2020.01)
*G01S 7/481*     (2006.01)
(Continued)

(52) U.S. Cl.
CPC .......... *G01S 7/4861* (2013.01); *G01S 7/4816* (2013.01); *G01S 7/4817* (2013.01); *G01S 17/10* (2013.01); *G01S 17/894* (2020.01); *G01S 17/931* (2020.01)

(58) Field of Classification Search
CPC .... G01S 7/4861; G01S 17/931; G01S 17/894; G01S 7/4816; G01S 7/4817; G01S 17/10; G01S 7/4873
See application file for complete search history.

(56) References Cited

U.S. PATENT DOCUMENTS 6,137,566 A    10/2000   Leonard et al.
6,288,383 B1    9/2001   Ureach et al.
(Continued)

FOREIGN PATENT DOCUMENTS

CN    109387819 A   *   2/2019   ............. G01S 17/02
CN    107085207 B   *   5/2020   ............. G01S 17/08
(Continued)

OTHER PUBLICATIONS

Machine Translation of JP2016176750A (a translation of the abstract, along with the original document, was provided by Applicant) (Year: 2016).*

(Continued)

*Primary Examiner* — Yuqing Xiao
*Assistant Examiner* — Benjamin Richard Hebert
(74) *Attorney, Agent, or Firm* — CANTOR COLBURN LLP (57) ABSTRACT

A light detection device includes a light projector, a light receiver, a detector, and a controller. The light projector projects light to a predetermined range. The light receiver has a light receiving region in which light is received. The detector detects light by comparing a light reception result by the light receiver with a predetermined threshold. The controller controls the threshold. The controller shifts in turn a range where light is projected from the light projector. The controller, causes the detector to detect light per a portion of the light receiving region, the portion corresponding to a range with light being projected from the light projector, and (Continued)

sets the threshold based on a light reception result by the light receiver in a different portion of the light receiving region from the portion corresponding to the range with light being projected.

8 Claims, 9 Drawing Sheets

(51) Int. Cl.
*G01S 17/10* (2020.01)
*G01S 17/894* (2020.01)
*G01S 17/931* (2020.01)

(56) References Cited

U.S. PATENT DOCUMENTS

| | | | |
|---|---|---|---|
| 2004/0169840 | A1 | 9/2004 | Hoashi et al. |
| 2011/0273286 | A1* | 11/2011 | Sklar .................. A61F 5/05891 602/17 |
| 2016/0041035 | A1* | 2/2016 | Allen .................. G01J 1/0266 356/402 |
| 2017/0273161 | A1 | 9/2017 | Nakamura |
| 2020/0033450 | A1* | 1/2020 | Zhang .................. G01S 7/4815 |

FOREIGN PATENT DOCUMENTS

| | | |
|---|---|---|
| JP | 1098984 A | 4/1989 |
| JP | H07191148 A | 7/1995 |
| JP | 2004177350 A | 6/2004 |
| JP | 2016176750 A | 10/2016 |
| JP | 2017173298 A | 9/2017 |

OTHER PUBLICATIONS

Machine Translation of CN-109387819-A (Used solely to establish effective filing date of another source) (Year: 2019).*
Machine Translation of CN-107085207-B (Used solely to establish effective filing date of another source) (Year: 2020).*
International Search Report for International Application No. PCT/JP2019/008021; Date of Mailing, May 28, 2019.
Written Opinion of the International Searching Authority for International Application No. PCT/JP2019/008021; Date of Mailing May 28, 2019.
JPO Notice of Reasons for Refusal for corresponding JP Application No. 2018-045770; Date of Mailing, Feb. 2, 2021.

* cited by examiner

FIG.7A 1ST LIGHT SOURCE

FIG.7B 2ND LIGHT SOURCE

FIG.7C 3RD LIGHT SOURCE

FIG.7D 4TH LIGHT SOURCE

FIG.7G 1ST PHOTOSENSOR SET

FIG.7H 2ND PHOTOSENSOR SET

FIG.7I 3RD PHOTOSENSOR SET

FIG.7J 4TH PHOTOSENSOR SET

LIGHT DETECTION DEVICE, LIGHT DETECTION METHOD, AND LIDAR DEVICE

This is the U.S. national stage of application No. PCT/JP2019/008021, filed on Mar. 1, 2019. Priority under 35 U.S.C. § 119(a) and 35 U.S.C. § 365(b) is claimed from Japanese Application No. 2018-045770 filed Mar. 13, 2018, the disclosure of which is also incorporated herein by reference.

TECHNICAL FIELD

The present disclosure relates to a light detection device, a light detection method, and a lidar device including the light detection device.

BACKGROUND ART

Patent Document 1 discloses an object detection apparatus mounted on a vehicle as a lidar. The object detection apparatus includes: a light emission unit including a light source; a light detector that receives light emitted from the light emission unit and reflected by an object; a signal detector to be input with an output signal of the light detector; and a control unit. A threshold for signal detection is set in the signal detector. The control unit acquires a noise level from output of the light detector when the light emission unit does not emit light, and sets the threshold based on this noise level. Patent Document 1 discloses that it is optimal to set the threshold to the maximum noise level to be expected at the initial state for the system.

CITATION LIST

Patent Document

Patent Document 1: JP 2017-173298 A

SUMMARY

Technical Problem

The inventor of the present application focused on the fact that it is possible to reduce the influence of ambient light from the outside and to enhance the accuracy of light detection of projected light by shortening a time interval from setting of a threshold to detection of reflected light. In Patent Document 1, however, the threshold is set based on the output of the light detector when no light is projected from the light emission unit. Thus, a period during which light projection is not performed is required in addition to a period during which light projection is performed, and it is difficult to perform highly accurate light detection speedily in the related art.

An object of the present disclosure is to provide a light detection device, a light detection method, and a lidar device that can facilitate speedy light detection.

Solution to Problem

A light detection device according to the present disclosure includes a light projector, a light receiver, a detector, and a controller. The light projector projects light to a predetermined range. The light receiver has a light receiving region in which light is received. The detector detects light by comparing a light reception result by the light receiver with a predetermined threshold. The controller controls the threshold. The controller shifts in turn a range where light is projected from the light projector. The controller causes the detector to detect light per a portion of the light receiving region, the portion corresponding to a range with light being projected from the light projector, and sets the threshold based on a light reception result by the light receiver in a different portion of the light receiving region from the portion corresponding to the range with light being projected.

A light detection method according to the present disclosure provides a method by which a light detection device detects light, the light detection device including a light projector that projects light to a predetermined range and a light receiver that has a light receiving region in which light is received.

A lidar device according to the present disclosure includes a light detection device and a distance calculator. The distance calculator calculates a distance through which detected light passes based on a light detection result of the light detection device.

Advantageous Effect

According to the light detection device, the light detection method, and the lidar device according to the present disclosure, the speedy light detection can be facilitated.

DETAILED DESCRIPTION

Hereinafter, embodiments of a light detection device, a light detection method, and a lidar device according to the present disclosure will be described with reference to the accompanying drawings. Note that, the same components are denoted by the same reference signs in each of the following embodiments.

Application Example

Figure 1:
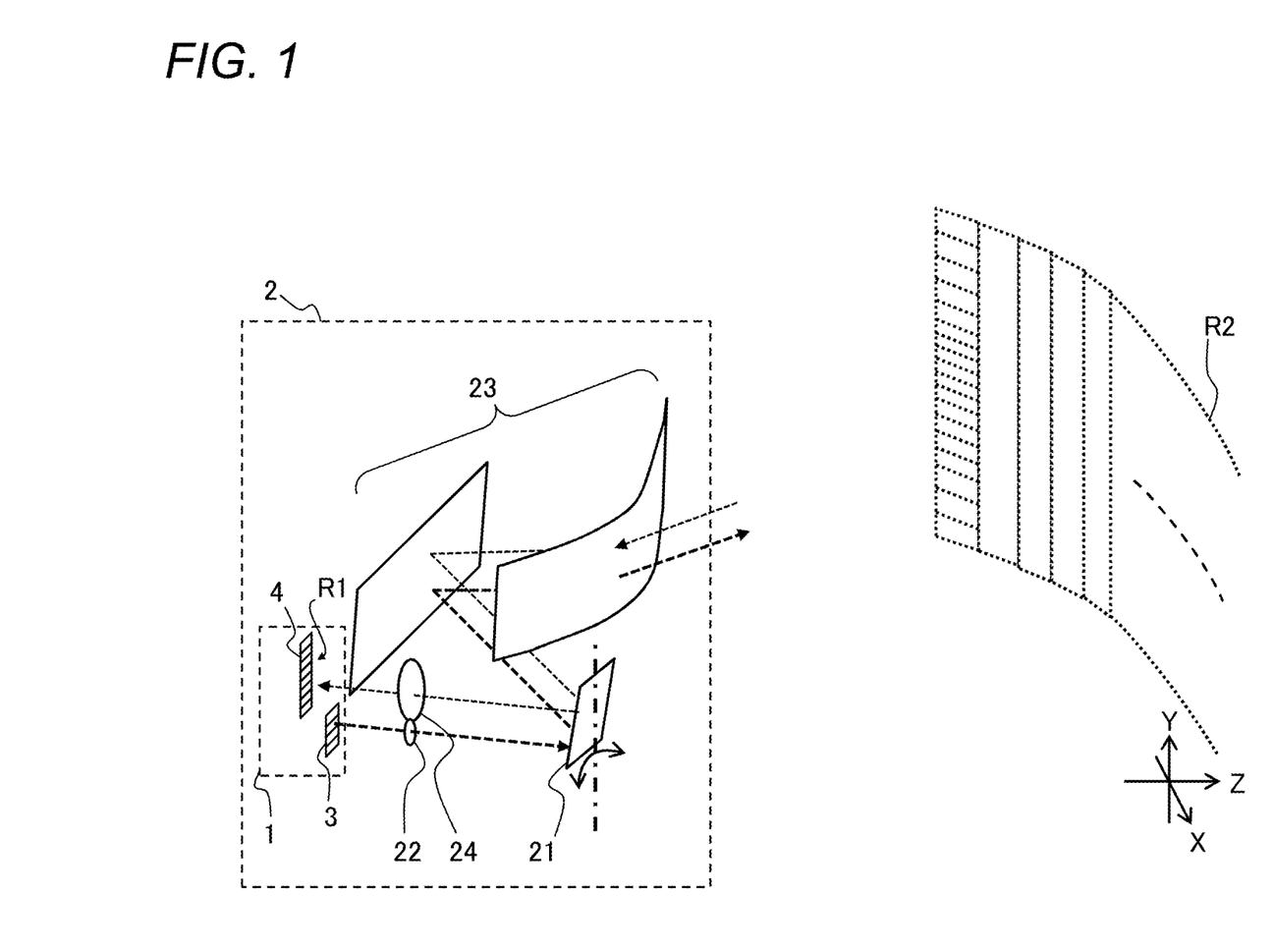
FIG. 1 is a view for describing an application example of a light detection device according to the present disclosure.

An example to which a light detection device according to the present disclosure can be applied will be described with reference to FIG. 1. FIG. 1 is a view for describing an application example of a light detection device 1 according to the present disclosure.

The light detection device 1 according to the present disclosure can be applied to, for example, a lidar device 2 for in-vehicle applications. As illustrated in FIG. 1, the light detection device 1 includes a light projector 3 that projects light to the outside and a light receiver 4 that receives light from the outside. The lidar device 2 a device for measuring a distance to an object reflected the light, by detecting reflected light of the light projected from the light projector 3 using the light detection device 1.

For example, the lidar device 2 generates a distance image that three-dimensionally illustrates various objects in an external environment of a vehicle on which the lidar device 2 is mounted. FIG. 1 illustrates a projection plane R2 corresponding to an angle of view of a distance image in the lidar device 2. The distance image of the lidar device 2 illustrates a distance in a depth direction Z for each pixel arrayed in a horizontal direction X and a vertical direction Y. Hereinafter, the +Y side and −Y side are sometimes referred to as the upper side and the lower side, respectively.

The lidar device 2 performs a distance measurement using the light detection device 1 with an optical scanner 21 scanning the projection plane R2 in the horizontal direction X, for example. The light receiver 4 of the light detection device 1 has a light receiving region R1 corresponding to a plurality of pixels of the distance image arrayed in the vertical direction Y. The resolution of the distance image, that is, the angle of view for each pixel is, for example, 1.0 to 1.6 degrees in the horizontal direction X and 0.3 to 1.2 degrees in the vertical direction Y.

In the light detection device 1 of the lidar device 2 as described above, ambient light caused in the external environment can enter the light receiver 4 together with the reflected light of the light from the light projector 3, and thus, a threshold is set to remove the influence of the ambient light as noise. The detecting accuracy of the light detection device 1 can be improved by shortening a period from the detection of the ambient light to the distance measurement. To this end, the light detection device 1 of the application example dynamically sets the threshold by repeating the detection of the ambient light concurrently with the detection of the reflected light when generating the distance image of one frame, for example.

Configuration Example

Hereinafter, embodiments as configuration examples of the light detection device 1 and the lidar device 2 will be described.

First Embodiment

The configurations and operations of the lidar device 2 and the light detection device 1 according to the first embodiment will be described hereinafter.

1. Configuration

Figure 2:
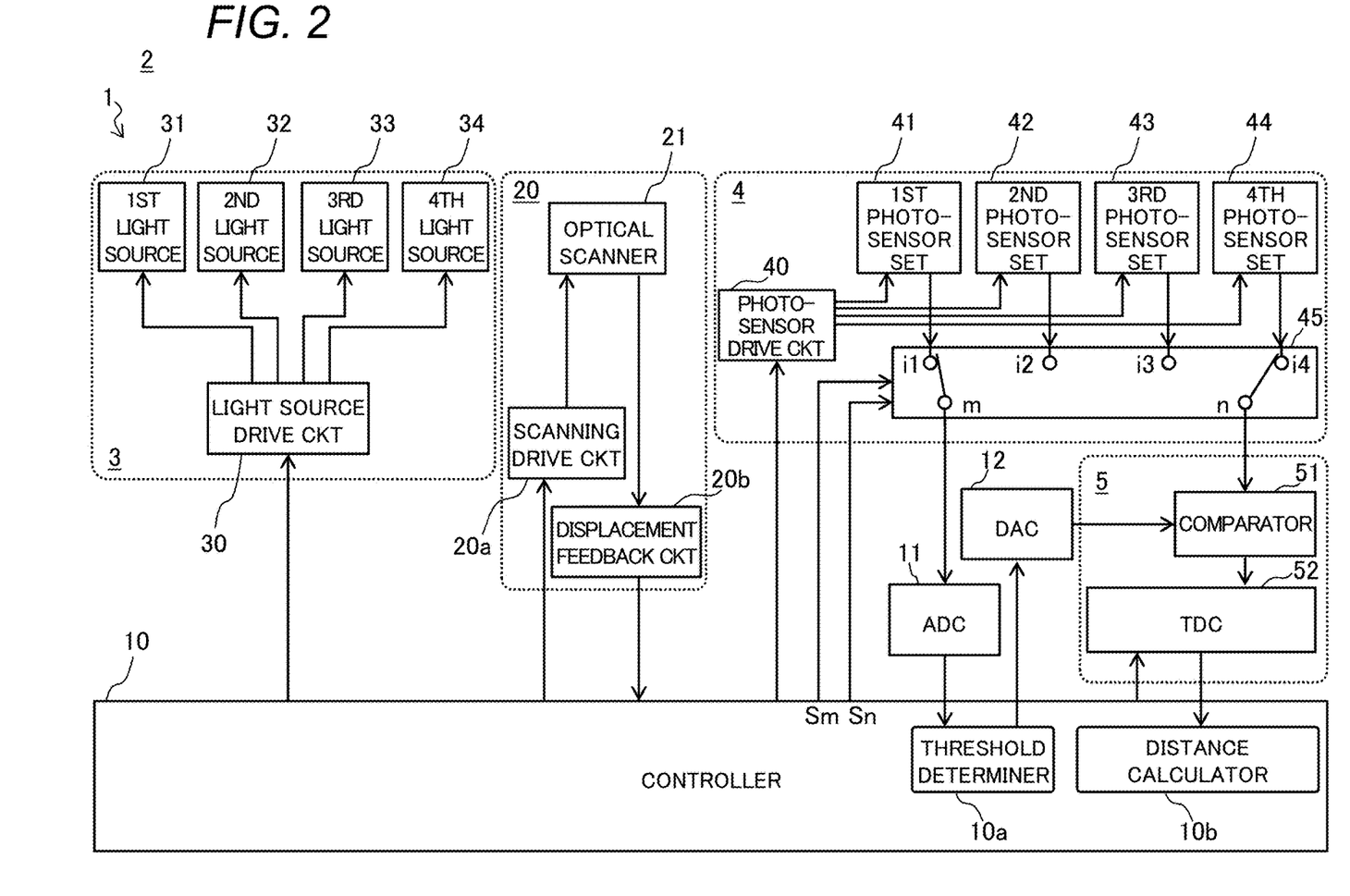
FIG. 2 is a block diagram illustrating a configuration of a lidar device according to a first embodiment.
Figure 3:
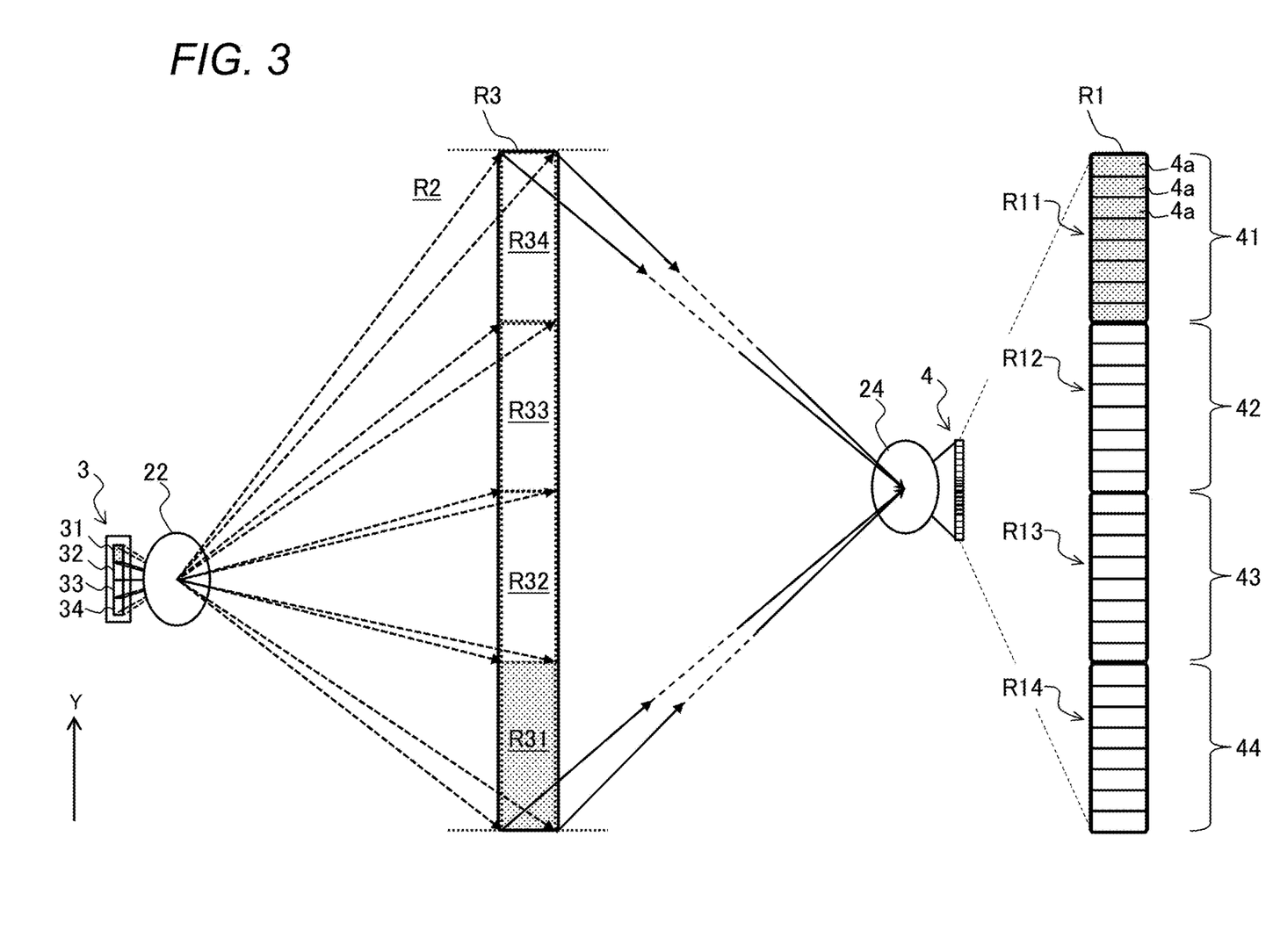
FIG. 3 is a view illustrating a correspondence between a light projector and a light receiver of the light detection device.

The configurations of the lidar device 2 and the light detection device 1 according to the present embodiment will be described with reference to FIG. 1, FIG. 2, and FIG. 3. FIG. 2 is a block diagram illustrating the configuration of the lidar device 2. FIG. 3 is a view illustrating a correspondence between the light projector 3 and the light receiver 4 of the light detection device 1.

The lidar device 2 includes an optical scanner 21, a light projecting lens 22, a magnifying optical system 23, a light receiving lens 24, and the light detection device 1, for example, as illustrated in FIG. 1. The lidar device 2 illustrated in FIG. 2 includes a scanner 20 including the optical scanner 21, and the light projector 3, the light receiver 4, a detector 5, and a controller 10 which constitute the light detection device 1.

The scanner 20 includes a scanning drive circuit 20a and a displacement feedback circuit 20b in addition to the optical scanner 21. The optical scanner 21 includes, for example, a mirror and a rotation mechanism that rotates the mirror around a rotation axis which is along the vertical direction Y. The scanning drive circuit 20a rotationally drives the mirror of the optical scanner 21 under the control of the controller 10. The displacement feedback circuit 20b detects displacement of the driven optical scanner 21 such as a rotation angle of the mirror, and outputs a feedback signal indicating a detection result to the controller 10.

The light projecting lens 22 (FIG. 1) is e.g. a collimator lens, arranged between the light projector 3 of the light detection device 1 and the optical scanner 21. The light receiving lens 24 is e.g. a condenser lens, arranged between the light receiver 4 of the light detection device 1 and the optical scanner 21. The optical scanner 21 is arranged to guide the light incident from the light projecting lens 22 to the magnifying optical system 23 and guide the light incident from the magnifying optical system 23 to the light receiving lens 24. The magnifying optical system 23 includes e.g. a lens and a mirror, magnifying a light flux of the light incident from the optical scanner 21, to emit the magnified light flux to the outside.

As illustrated in FIG. 2, the light projector 3 includes first to fourth light sources 31 to 34 and a light source drive circuit 30, for example. Each of the light sources 31 to 34 is a light source element such as an LD (laser diode) and an LED. Each of the light sources 31 to 34 may include a plurality of light source elements. The light source drive circuit 30 pulse-drives each of the light sources 31 to 34 under the control of the controller 10, for example.

FIG. 3 schematically illustrates a state where the light projector 3 projects light from the first light source 31 onto the projection plane R2. For example, the first to fourth light sources 31 to 34 are arranged in an array form of one row in the light projector 3 in order from the upper side in the vertical direction Y.

The light receiver 4 includes a plurality of photosensors 4a. FIG. 3 illustrates, in an enlarged manner, the light receiving region R1 formed by the photosensors 4a of the light receiver 4. In the light receiver 4, the plurality of photosensors 4a are arranged, for example, in an array form of one row along the vertical direction Y.

The photosensor 4a generates a light reception signal indicating a light reception result when receiving light. Each of the photosensors 4a corresponds to, for example, one pixel of a distance image. The photosensor 4a is a sensor element such as a single-photon avalanche photodiode (SPAD). The photosensor 4a may be a sensor element such as a photodiode (PD) or an avalanche photodiode (APD).

In the present configuration example, the photosensors 4a of the light receiver 4 can be grouped into first to fourth sets of the photosensors 41, 42, 43, and 44 so as to correspond to the first to fourth light sources 31 to 34 of the light projector 3, respectively. The number of the photosensors 4a per set is, for example, eight.

The above optical systems 22 to 24 are arranged such that light, incident onto the light receiver 4 from the same range as a range R3 in which the light projector 3 can project light on the external projection plane R2, is received in the light receiving region R1. As illustrated in FIG. 3, the light projectable range 3 is divided into first to fourth sections R31 to R34 along the vertical direction Y.

The first section R31 is a range where light is projected by the first light source 31, and corresponds to a light receiving region R11 of the first photosensor set 41. Similarly, second, third, and fourth sections R32, R33, and R34 are ranges where light is projected by the second, third, and fourth light sources 32, 33, and 34, respectively, and correspond to light receiving regions R12, R13, and R14 of the second, third, and fourth photosensor sets 42, 43, and 44, respectively.

Returning to FIG. 2, the light receiver 4 further includes, for example, a photosensor drive circuit 40 and a multiplexer 45. The photosensor drive circuit 40 drives the respective photosensor sets 41 to 44. The multiplexer 45 has first to fourth input terminals i1 to i4 connected to the respective photosensor sets 41 to 44, an output terminal n for distance measurement, and an output terminal m for threshold determination.

The multiplexer 45 of the light receiver 4 connects each of the output terminals n and m to one of the first to fourth input terminals i1 to i4 according to selection signals Sn and Sm from the controller 10. As a result, the light receiver 4 outputs a light reception signal for one set of the photosensors 4a from each of the output terminals m and n.

The controller 10 includes, for example, a CPU, a RAM, a ROM, and the like, and controls each component according to various information processing. For example, the controller 10 reads a program and data stored in the ROM into the RAM, and executes various arithmetic processes to implement various operations.

For example, the controller 10 generates a selection signal Sn for distance measurement to select, from among the first to fourth input terminals i1 to i4 of the light receiver 4, a connecting terminal with the output terminal n, or generates a selection signal Sm for threshold determination to select a connecting terminal with the output terminal m. The controller 10 also operates as a threshold determiner 10a and a distance calculator 10b which will be described later. The controller 10 may include an ASIC, an FPGA, and the like. The threshold determiner 10a, the distance calculator 10b, and the like may be configured by dedicated hardware circuits, respectively.

The detector 5 includes, for example, a comparator 51 and a time/digital converter (TDC) 52. The comparator 51 compares the light reception signal output from the output terminal n for distance measurement in the light receiver 4 with the threshold determined by the threshold determiner 10a, and outputs a signal indicating a comparison result to the TDC 52. The TDC 52 is an example of a time measurement circuit that measures a period from a timing input by the controller 10 to a timing corresponding to the comparison result of the comparator 51. The distance calculator 10b calculates a distance value for each pixel based on the period measured by the TDC 52.

In the present embodiment, the light detection device 1 further includes an analog/digital converter (ADC) 11 and a digital/analog converter (DAC) 12. The ADC 11, the DAC 12, and the threshold determiner 10a of the present embodiment are examples of a threshold setting module that sets the threshold in the light detection device 1.

The ADC 11 converts the light reception signal output from the output terminal m for threshold determination in the light receiver 4 from an analog value to a digital value, and outputs the converted light reception signal to the threshold determiner 10a. The threshold determiner 10a executes calculation processing for setting the threshold based on the received light reception signal to determine the threshold. The DAC 12 digitally inputs the threshold determined by the threshold determiner 10a, converts the threshold into an analog voltage, and outputs the analog voltage to the comparator 51. As a result, the threshold is set in the detector 5.

In the present embodiment, the ADC 11, the DAC 12, the comparator 51, and the TDC 52 in the light detection device 1 are provided as many as, for example, the number of the photosensors 4a in the one set in the light receiver 4. With this, the controller 10 may execute various operations for the one set of the photosensors 4a in parallel or sequentially.

2. Operation

The operations of the lidar device 2 and the light detection device 1 configured as described above will be described hereinafter.

2-1. Operation of Lidar Device

Figure 4A:
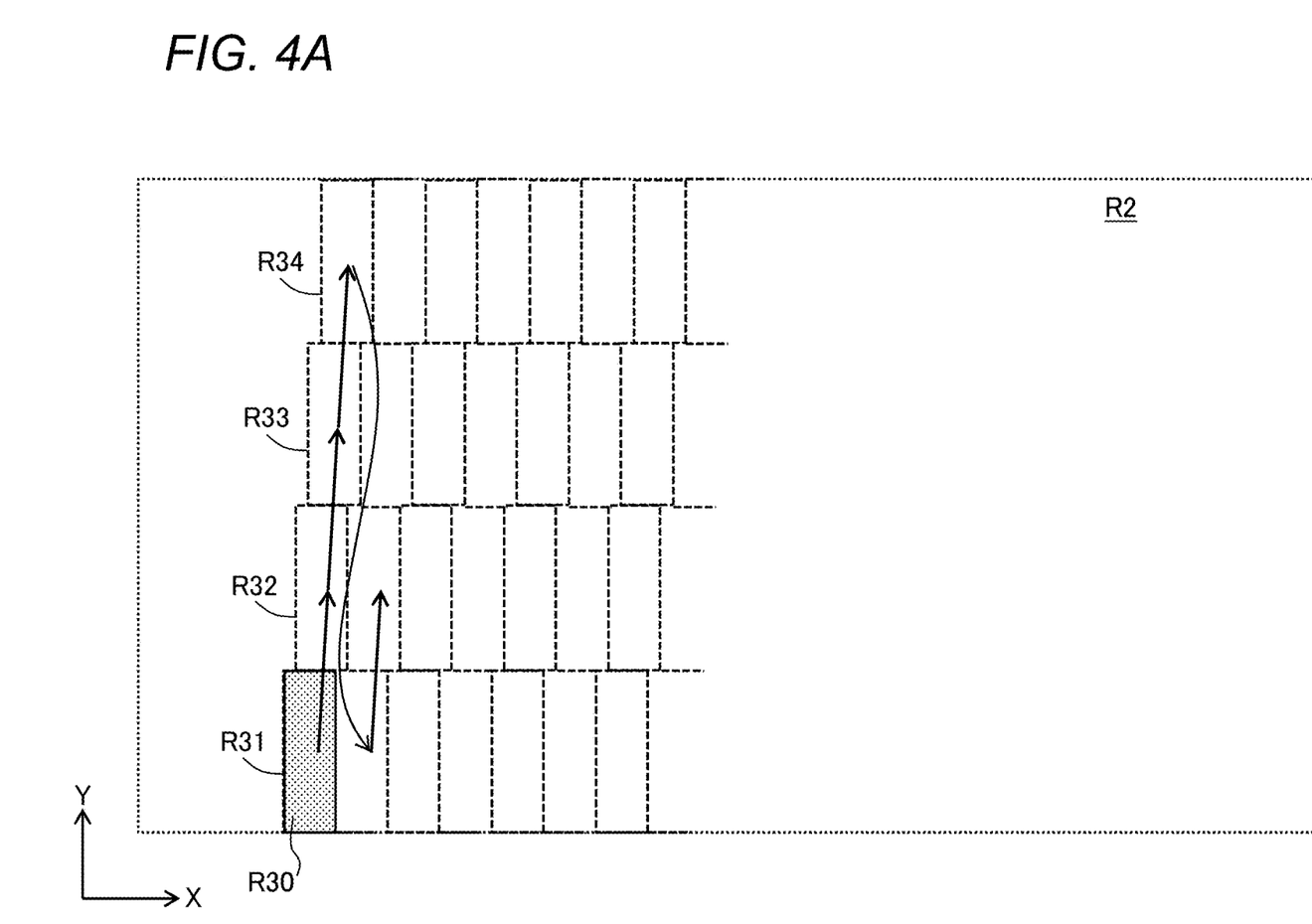
FIG. 4A is a view for describing scanning of the lidar device.
Figure 4B:
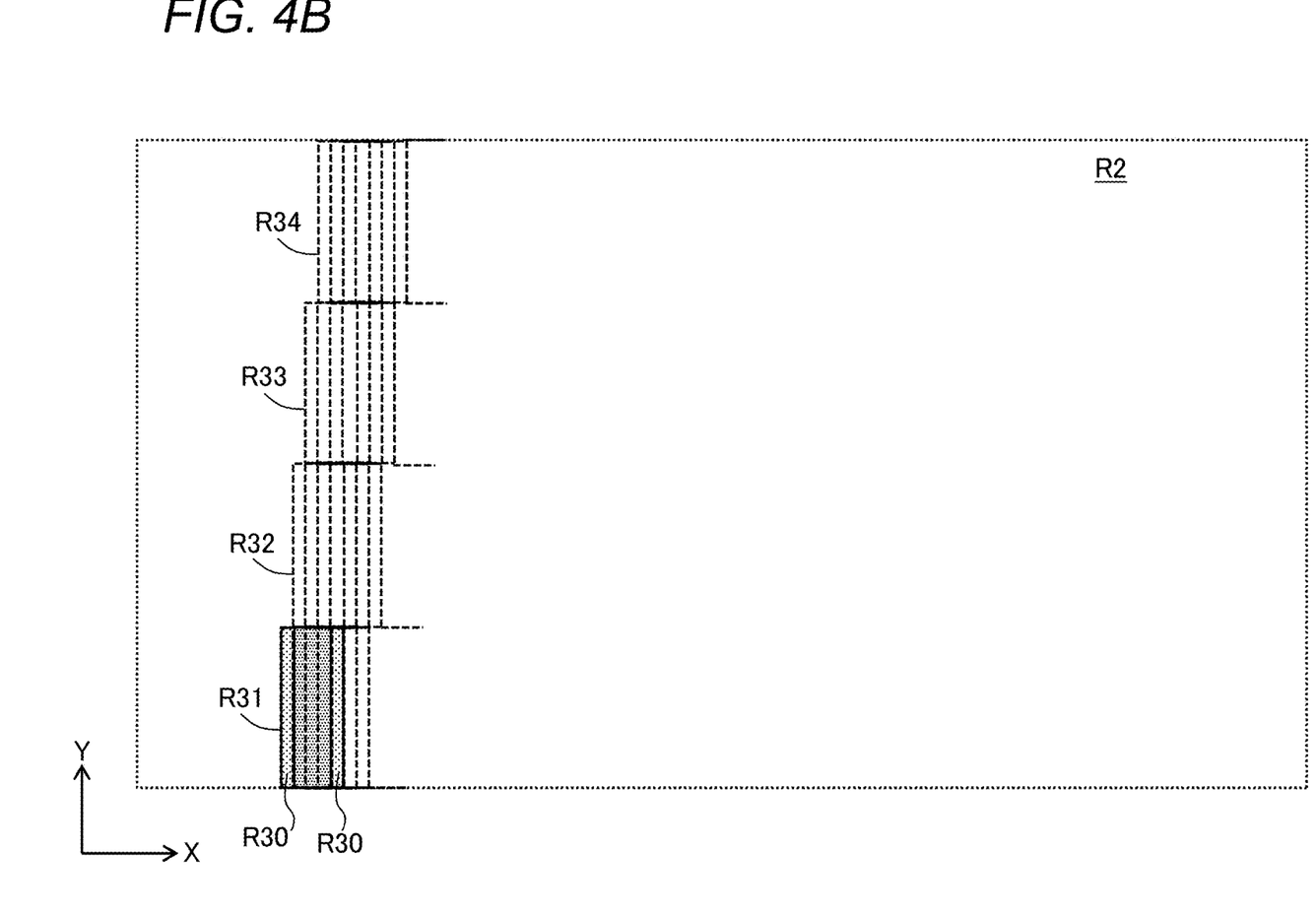
FIG. 4B is a view for describing details of scanning of the lidar device.

The operation of the lidar device 2 according to the present embodiment will be described with reference to FIG. 4A and FIG. 4B. FIG. 4A is a view for describing scanning of the lidar device 2. FIG. 4B is a view for describing the details of scanning of the lidar device 2.

In the lidar device 2 of the present embodiment, the controller 10 controls the light source drive circuit 30 of the light projector 3 to cause the first to fourth light sources 31 to 34 to be sequentially turned on (to emit pulses of light) one by one. In addition, the controller 10 controls the scanning drive circuit 20a of the scanner 20 to cause the optical scanner 21 to scan the light projected in the horizontal direction X.

FIG. 4A and FIG. 4B exemplify a range R30 (hereinafter, referred to as a "light projection range") of the projection plane R2 where light is projected from a light source turned on in the light projector 3. The light projection range R30 on the projection plane R2 is shifted in turn among the first to fourth sections R31 to R34 (FIG. 3) at a position in the horizontal direction X during scanning. As a result, the light projection range R30 two-dimensionally moves on the projection plane R2 as schematically illustrated by the arrow in FIG. 4A. As illustrated in FIG. 4B, such scanning is performed with the light projection ranges R30 before and after the movement in the horizontal direction X overlapped on each other, for example.

The controller 10 can recognize a position of the light projection range R30 in the horizontal direction X based on a signal from the displacement feedback circuit 20b of the scanner 20, and can recognize a position of the light projection range R30 in the vertical direction Y according to the turning-on light source, for example.

The detector 5 of the light detection device 1 performs the threshold determination on the light reception signal from the light receiver 4 to detect reflected light of the projected light. With each of the light projection ranges R30 as an object of distance measurement, the detector 5 measures a period from the time when the light is projected by the light projector 3 to the time when the reflected light is detected, by the TDC 52. Based on the period measured by the TDC 52, the distance calculator 10b of the lidar device 2 calculates a distance value of each pixel for each of the light projection ranges R30 moving on the projection plane R2. The lidar device 2 superimposes the light projection ranges R30 on each other as illustrated in FIG. 4B to sequentially perform the measurement, and performs calculation processing of averaging on the superposed portion.

As the above scanning of the projection plane R2 is repeated, it is possible to sequentially generate distance images at a desired frame rate (for example, 30 fps). In addition, since the plurality of photosensors 4a in the light receiver 4 are grouped for use, the distance image for each frame can be generated at high speed with the circuit area of the light detection device 1 reduced.

In the light detection device 1 of the present embodiment, the controller 10 dynamically sets the threshold, to be used for the detection of reflected light in the detector 5, based on the light reception signal indicating the light reception result outside the light projection range R30 when light is projected to each of the light projection ranges R30.

2-2. Threshold of Light Detection Device

The threshold in the light detection method of the light detection device 1 will be described with reference to FIG. 5A to FIG. 5E.

FIGS. 5A to 5E exemplify light reception signals in various cases. In FIG. 5A to FIG. 5E, the horizontal axis represents a time t, and the vertical axis represents a voltage V.

Figure 5A:
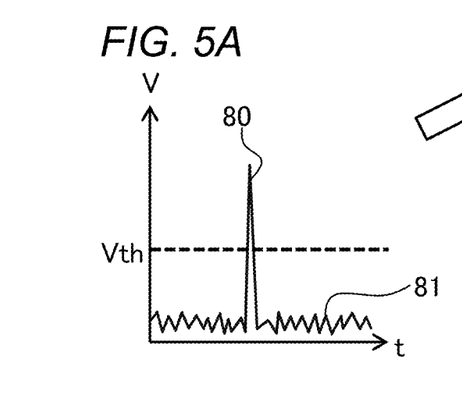
FIG. 5A to FIG. 5E are views for describing a threshold in a light detection method of the light detection device.

FIG. 5A exemplifies a light reception signal in an ideal case and a preset threshold Vth. The light reception signal includes a reflected light component 80 corresponding to reflected light of projected light and an ambient light component 81 corresponding to ambient light. In the example of FIG. 5A, the preset threshold Vth is larger than the ambient light component 81 of the light reception signal and smaller than the reflected light component 80. In this case, the detector 5 can detect a timing at which the reflected light component 80 is obtained when the light reception signal exceeds the threshold Vth.

Figure 5B:
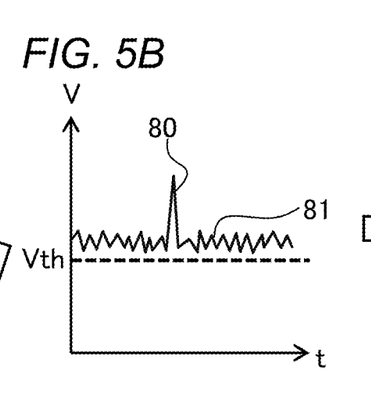
Figure 5C:
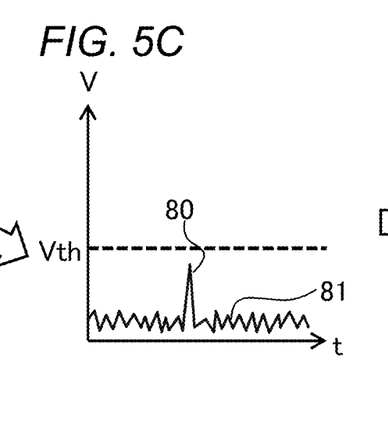

In the lidar device 2, for example, it is considered that each intensity of the ambient light component 81 and the reflected light component 80 change every moment due to movement of the light projection range R30 or a change in the external environment of the vehicle. FIG. 5B and FIG. 5C exemplify light reception signals in a case where the ambient light component 81 gets larger and a case where the reflected light component 80 gets smaller, from the same setting of the threshold Vth as in FIG. 5A.

In the case of FIG. 5B, as the ambient light component 81 is larger than the threshold Vth, a situation is conceivable where noise caused by ambient light is erroneously detected as reflected light. In the case of FIG. 5C, as the reflected light component 80 is smaller than the threshold Vth, a situation is conceivable where the reflected light fails to be detected. To solve this, the light detection device 1 of the present embodiment detects the ambient light component 81 during distance measurement in the lidar device 2 to update the threshold Vth according to a detection result.

Figure 5D:
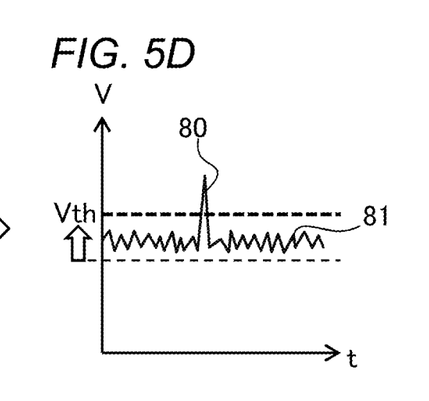
Figure 5E:
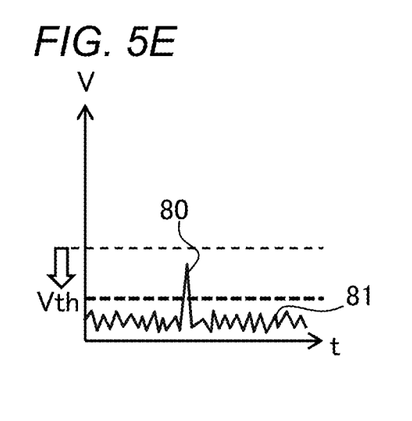

FIG. 5D and FIG. 5E illustrate examples in which the light detection device 1 of the present embodiment updates the setting of the threshold Vth from the cases similar to FIG. 5B and FIG. 5C, respectively. The threshold Vth in the example of FIG. 5D is increased to exceed the ambient light component 81 from the case of FIG. 5B. The threshold Vth in the example of FIG. 5E is lowered within a range exceeding the ambient light component 81 from the case of FIG. 5C. With such update of the setting of the threshold Vth, it is possible to improve the accuracy for detecting the reflected light component 80 in the light detection device 1 by avoiding the situations illustrated in FIG. 5B and FIG. 5C.

In the light detection device 1, by inputting the light reception signal considered not to include the reflected light component 80, the controller 10 as the threshold determiner 10a can detect the intensity of the ambient light component 81 and determine the threshold. For example, the threshold determiner 10a calculates a value larger than the ambient light component 81 by a predetermined width as the threshold Vth. The threshold determiner 10a may calculate an average to derive the threshold Vth. Hereinafter, details of the operation of the light detection device 1 will be described.

2-3. Operation of Light Detection Device

The operation of the light detection device 1 according to the present embodiment will be described with reference to FIG. 6 to FIG. 8D.

Figure 6:
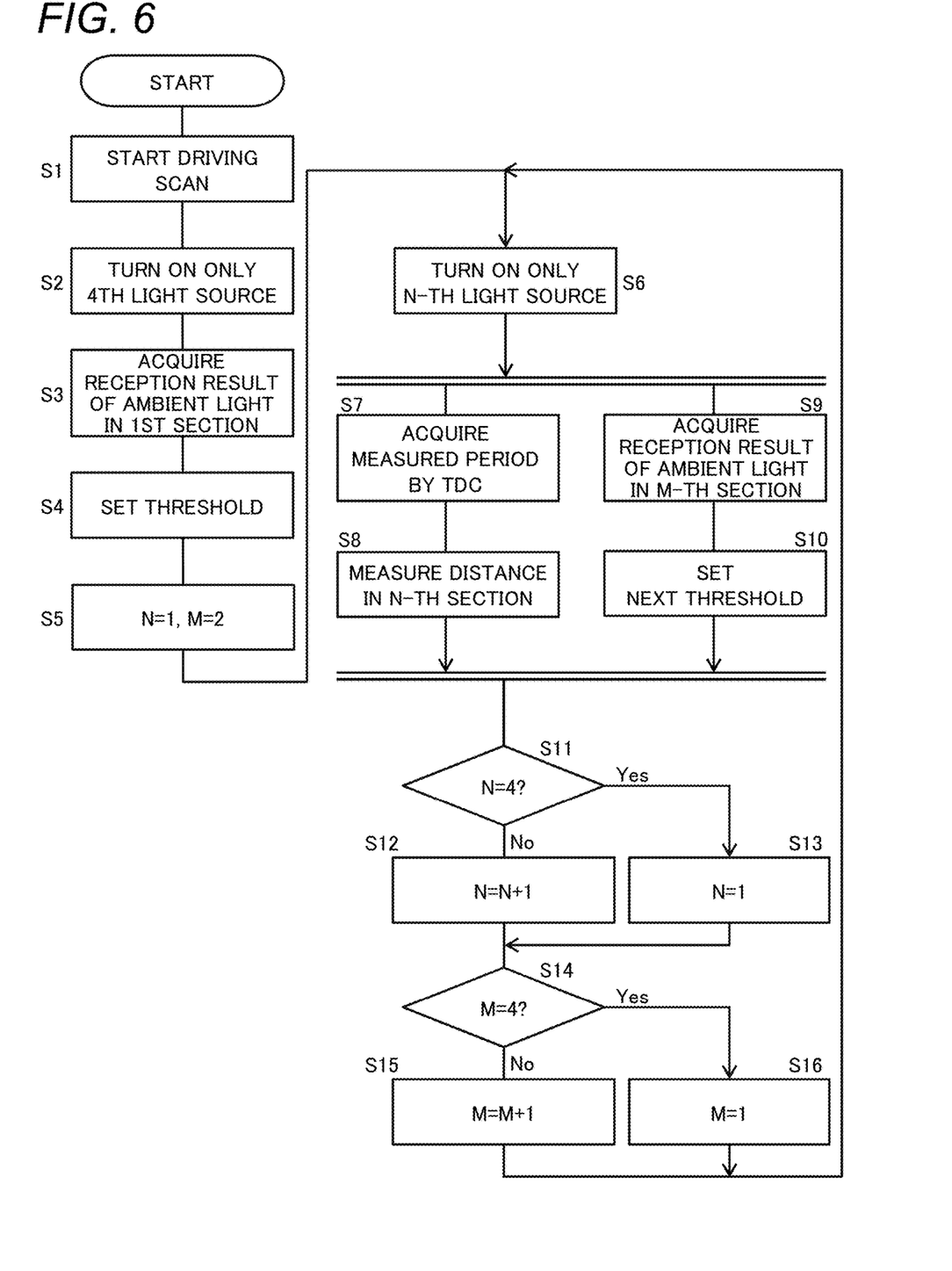
FIG. 6 is a flowchart illustrating an operation example of the light detection device.

FIG. 6 is a flowchart illustrating the operation of the light detection device 1. Each process according to the flowchart of FIG. 6 is executed by the controller 10 of the light detection device 1. FIG. 7A to FIG. 7J are timing charts illustrating an operation example of the light detection device 1. FIG. 8A to FIG. 8D are views for describing the operation example of the light detection device 1.

Figure 7A:
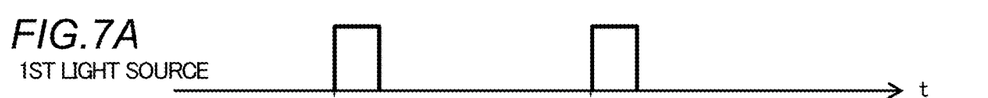
FIG. 7A to FIG. 7J are timing charts illustrating an operation example of the light detection device.

FIG. 7A, FIG. 7B, FIG. 7C, and FIG. 7D illustrate lighting timings of the first, second, third, and fourth light sources 31 to 34, respectively. FIG. 7E illustrates a control timing of the selection signal Sn for distance measurement. FIG. 7F illustrates a control timing of the selection signal Sm for threshold determination. FIG. 7G, FIG. 7H, FIG. 7I, and FIG. 7J illustrate output timings of the first, second, third, and fourth photosensors 41 to 44, respectively.

In the flowchart of FIG. 6, first, the controller 10 controls the scanner 20 to start driving the optical scanner 21 (S1). In addition, the controller 10 controls the light projector 3 to turn on only the fourth light source 34 at time t0 in FIG. 7D (S2). The projection plane R2 at time t0 is illustrated in FIG. 8A.

Figure 8A:
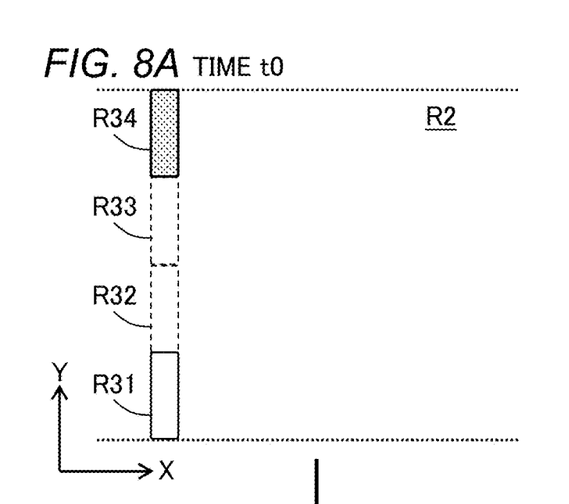
FIG. 8A to FIG. 8D are views for describing an operation example of the light detection device.

On the projection plane R2 of FIG. 8A, light is projected from the light projector 3 to the fourth section R34 among the first to fourth sections R31 to R34 corresponding to the respective photosensor sets 41 to 44. From the first to third sections R31 to R33, ambient light is incident to the first to third photosensor sets 41 to 43.

The controller 10 acquires a light reception result by the first photosensor set 41 (S3). For example, the controller 10 outputs a light reception signal of the first photosensor set 41 from the light receiver 4 to the ADC 11 (FIG. 2) with the initial setting of the output terminal m for threshold determination (FIG. 7E). The ADC 11 converts the received light reception signal into a digital value and outputs the digital value to the controller 10.

Next, the controller 10 operates as the threshold determiner 10a to set the threshold according to the acquired light reception result (S4). The controller 10 detects the intensity of ambient light based on the light reception signal from the ADC 11, and calculates the threshold according to a detection result. The controller 10 sets the calculated threshold in the detector 5 via the DAC 12. By the processing of Steps S2 to S5, the threshold is set according to the ambient light in the current first section R31.

In addition, regarding a variable N (=1 to 4) for distance measurement and a variable M (=1 to 4) for threshold determination, the controller 10 sets N=1 and M=2, respectively (S5). For example, the controller 10 generates the selection signal Sn so as to control a connecting terminal with the output terminal m for distance measurement to the first input terminal i1 (FIG. 7E), and generates the selection signal Sm so as to control a connecting terminal with the output terminal m for threshold determination to the second input terminal i2 (FIG. 7F).

Furthermore, the controller 10 turns on only an N-th light source among the plurality of light sources 31 to 34 of the light projector 3 based on the set variable N for distance measurement (S6). For example, the controller 10 turns on the first light source 31 at time t1 after Step S5 as illustrated in FIG. 7A (S6). The projection plane R2 at time t1 is illustrated in FIG. 8B.

Figure 7E:
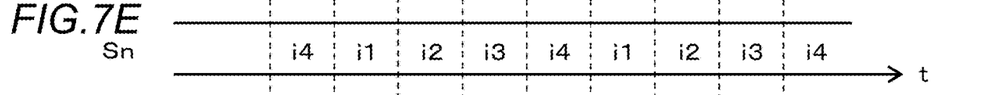
Figure 7G:
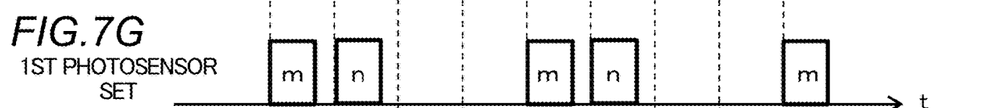
Figure 8B:
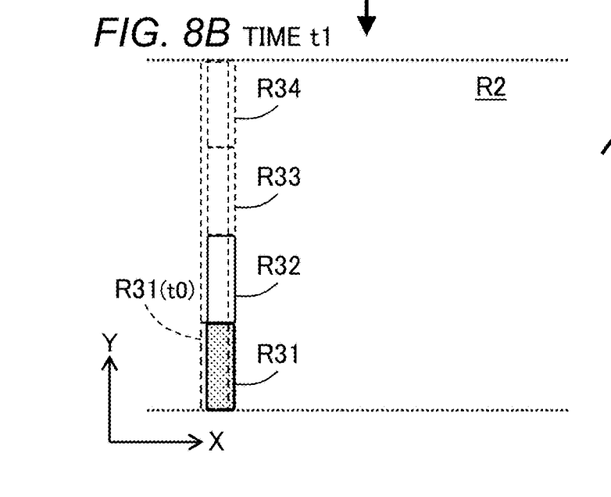

On the projection plane R2 of FIG. 8B, light is projected from the light projector 3 to the first section R31. Then, reflected light of the light from the light projector 3 is received by the first photosensor set 41. At this time, the light receiver 4 outputs a light reception signal from the first photosensor set 41 to the detector 5 in response to the selection signal Sn of N=1 (S5) (FIGS. 7E and 7G).

The controller 10 acquires a measured period by the TDC 52 from the detector 5 (S7). For example, the controller 10 causes the TDC 52 to start measuring the period at the time of executing Step S6. The detector 5 causes the comparator 51 to compare the input light reception signal with the set threshold. The detector 5 causes the TDC 52 to output a signal indicating the measured period when the light reception signal in the comparator 51 exceeds the threshold.

Next, the controller 10 operates as the distance calculator 10b to perform an calculation processing for distance measurement in the projected N-th section based on the measured period thus acquired (S8). For example, the controller 10 calculates a distance value by multiplying the measured period indicated by the signal from the TDC 52 and a speed of light. The controller 10 stores the distance value for each pixel in association with a position in the horizontal direction X and the vertical direction Y.

In addition, the controller 10 acquires a light reception result of an M-th photosensor in the light receiver 4 (S9). For example, the light receiver 4 outputs a light reception signal from the second photosensor set 32 to the controller 10 via the ADC 11 in response to the selection signal Sm of M=2 at time t1 (S5) (FIG. 7F and FIG. 7H). As illustrated in FIG. 8B, the light reception signal indicates a result of receiving the ambient light in the second section R32 where light is not projected.

Next, the controller 10 sets the threshold based on the acquired light reception result of the M-th photosensor (S10). The process of Step S10 is performed in the same manner as Step S5. The newly set threshold is used when executing the next Steps S6 to S7. For example, the controller 10 executes Steps S7 to S8 and Steps S9 to S10 in parallel.

Next, the controller 10 updates the variable N for distance measurement (S11 to S13). For example, the controller 10 determines whether the set variable N reaches "4" (S11), and in the case of not reaching N=4 (No in S11), increments the variable N to "N+1" (S12). On the other hand, in the case of reaching N=4 (Yes in S11), the controller 10 updates the variable N to "1" (S13). The controller 10 generates the selection signal Sn according to the updated variable N, and switches a connecting terminal with the output terminal n for distance measurement (FIG. 7E).

Then, the controller 10 updates the variable M for threshold determination (S14 to S16). The processes of Steps S14 to S16 are executed in the same manner as Steps S11 to S13, for example. As a result, the selection signal Sm according to the updated variable M is generated, and a connecting terminal with the output terminal m for threshold determination is switched (FIG. 7F).

The controller 10 repeats the processing after Step S6 in a predetermined cycle (for example, 10 μsec) based on the updated variables N and M.

Figure 7B:
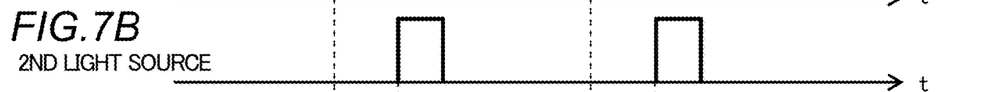
Figure 7C:
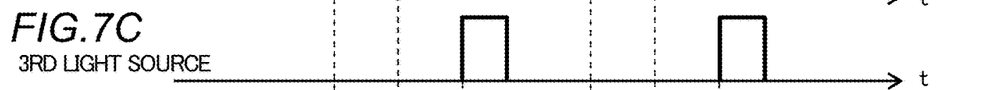
Figure 7D:
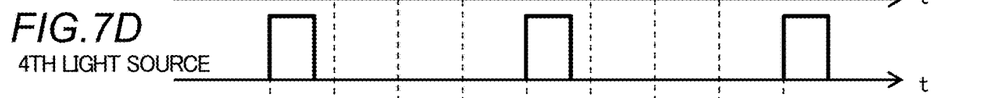
Figure 7F:
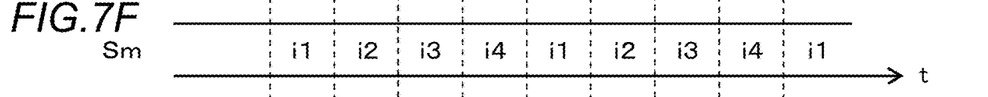
Figure 7H:
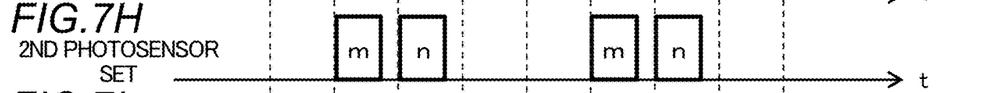
Figures 7I, 7J:
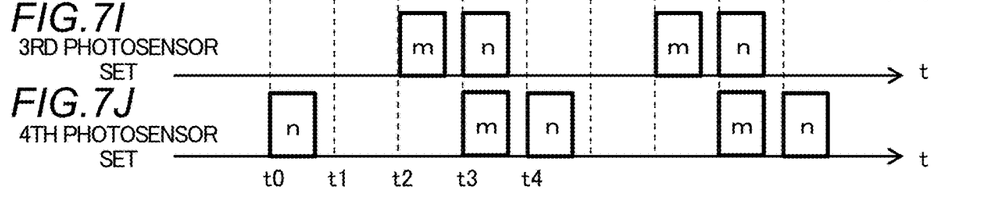
Figure 8C:
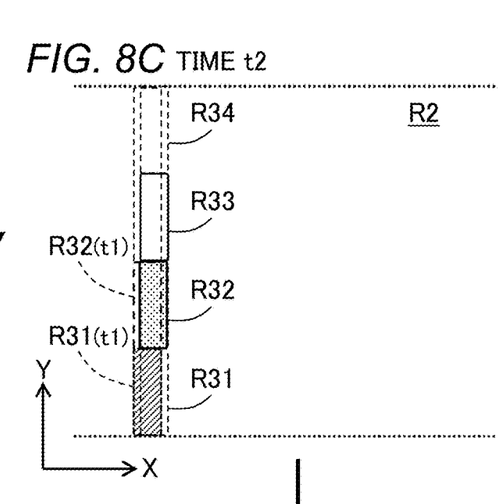
Figure 8D:
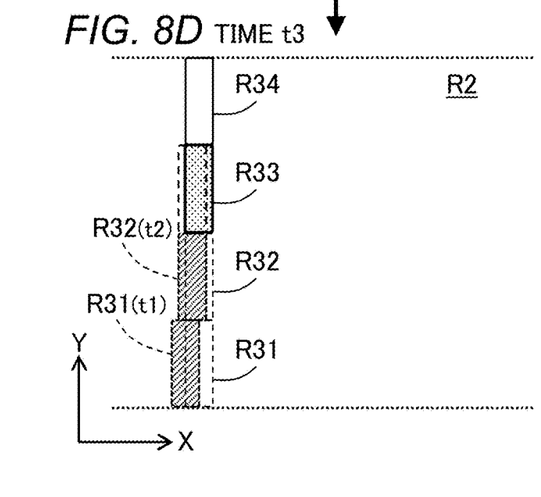

For example, the controller 10 turns on the second, third, and fourth light sources 42 to 44 at times t2, t3, and t4 as illustrated in FIG. 7B, FIG. 7C, and FIG. 7D (S6) to execute the processes of Steps S7 to S10 sequentially. The projection planes R2 at times t2 and t3 are illustrated in FIG. 8C and FIG. 8D, respectively. Note that a region for which distance measurement has been performed is shaded in FIG. 8C and FIG. 8D.

With the above processing, for example, the first light source 31 is turned on at time t1 (S6), and the distance measurement of the first section R31 where light is projected is executed (FIGS. 7G, S7, and S8). At this time, the threshold is updated by detecting ambient light of the second section R32 where light is not projected (FIGS. 7H, S9, and S10).

After turning off the first light source 31, the second light source 32 is turned on at time t2 (S6), and the distance measurement of the second section R32 is executed using the updated threshold (FIGS. 7H, S7, and S8). The second section R32 at time t2, which is an object of the distance measurement, is same as the second section R32 at time t1, which is used for the threshold determination, except for the shift of scanning in the horizontal direction as illustrated in FIG. 8C. In this manner, a situation for the ambient light can be approximated both temporally and spatially among the distance measurement and the threshold determination, so that the detection accuracy of the light detection device 1 can be improved.

In addition, measuring the distance in the N-th section, where light is being projected, and setting the threshold with detection of the ambient light of the M-th section, where light is to be projected next, are repeatedly executed in a simultaneous and parallel manner as illustrated in FIG. 7G to FIG. 7J. As a result, a highly accurate distance image can be efficiently obtained without reserving a lot of periods only for detecting ambient light until the distance measurement reaches the entire projection plane R2 of the distance image.

3. Summary

As described above, the light detection device 1 according to the present embodiment includes the light projector 3, the light receiver 4, the detector 5, and the controller 10. The light projector 3 projects light to the light projection range R30. The light receiver 4 has the light receiving region R1 for receiving light. The detector 5 detects light by comparing a light reception result by the light receiver 4 with a predetermined threshold. The controller 10 controls the threshold. The controller 10 shifts in turn the light projection range R30 among the first to fourth sections R31 to R34 in the light projectable range R3. The controller 10 causes the detector 5 to detect light per a portion corresponding to a range with light being projected from the light projector 3 in the light receiving region R1, and sets the threshold based on a light reception result by the light receiver 4 in a different portion of the light receiving region from the portion corresponding to the range with light being projected (S6 to S10).

According to the above light detection device 1, it is possible to set the threshold by acquiring a light reception result of a section where light is not projected with the detector 5 detecting light for each section where light is being projected from the light projector 3. As a result, it is possible to facilitate the speedy light detection as compared to a case where a light reception result for setting a threshold is obtained during a period in which no light is projected from the light projector 3.

In the present embodiment, the controller 10 sets the threshold based on the light reception result at the portion of the light receiving region R1 corresponding to the range where the light projector 3 projects light in next turn (see FIG. 7A to FIG. 7J). As a result, a state in which ambient light is detected for the threshold setting is in terms of time closer to a state in which light is detected by the detector 5, so that the threshold according to the ambient light can be accurately set.

In addition, the detector 5 may detect light when the portion used for the threshold setting in the light receiving region R1 corresponds to the range where light is projected by the light projector 3 based on the set threshold (see FIG. 8A to FIG. 8D). As a result, a state in which ambient light is detected for the threshold setting is spatially closer to a state in which light is detected by the detector 5, so that the threshold according to the ambient light can be accurately set.

In the present embodiment, the light projector 3 includes the plurality of light sources 31 to 34 arrayed in a row. The controller 10 shifts the light projection range R30 by causing the first to fourth light sources 31 to 34 to emit light in turn (S6). As a result, the light projection range R30 can be shifted with a simple configuration.

In the present embodiment, the light detection device 1 may further include the optical scanner 21. The optical scanner 21 scans the light projected by the light projector 3 in the horizontal direction X crossing the vertical direction Y in which the first to fourth light sources 31 to 34 are arrayed (S1). The controller 10 causes the detector 5 to detect the light during scanning by the optical scanner 21. As a result, the light detection of the entire projection plane R2 can be sequentially performed.

In the present embodiment, the light receiver 4 includes the plurality of photosensors 4a that form the light receiving region R1. The controller 10 causes the detector 5 to detect light for each of the sets 41 to 44 of the photosensors 4a respectively corresponding to the ranges where light is projected from the light sources 31 to 34 of the light projector 3 among the plurality of photosensors 4a (S6 to S8). As a result, the light detection can be efficiently performed for each of the sets 41 to 44 of the photosensors 4a.

In the present embodiment, the detector 5 includes the TDC 52 that measures the period from the timing at which the light projector 3 projects light to the timing at which the light is detected based on the threshold. With the TDC 52, the distance measurement can be performed by measuring the period during which reflected light of the projected light is obtained.

In addition, the lidar device 2 according to the present embodiment includes the light detection device 1 and the distance calculator 10b. The distance calculator 10b calculates a distance that detected light has passed based on a light detection result of the light detection device 1. According to the lidar device 2 of the present embodiment, the operation of the light detection device 1 facilitates the speedy light detection for distance measurement.

In addition, the light detection method according to the present embodiment is a method by which the light detection device 1 including the light projector 3 and the light receiver 4 detects light. This method includes: shifting in turn a range where light is projected from the light projector 3; detecting light by comparing a light reception result by the light receiver 4 with a predetermined threshold per a portion of the light receiving region corresponding to a range where light is being projected from the light projector 3; and setting the threshold based on a light reception result by the light receiver 4 in a portion other than the portion corresponding to the range where light is being projected in the light receiving region. According to this method, the speedy light detection can be facilitated.

Other Embodiments

In the first embodiment, the threshold is set based on the light reception result of the portion of the light receiving region R1 corresponding to the range where the light projector 3 next projects light (see FIG. 7). In the present embodiment, the threshold may be set based on a light reception result of a portion corresponding to the range where the light projector 3 projects light at a time subsequent to the next time. For example, the setting in Step S3 of FIG. 6 may be changed such that a difference between the variable N for distance measurement and the variable M for threshold determination is two or more. In this case, the controller 10 appropriately stores the determined threshold in an internal memory such as a RAM.

In addition, the example in which the light projector 3 includes the first to fourth light sources 31 to 34 has been described in each of the above embodiments. The number of light sources of the light projector 3 of the present embodiment is not limited to four. The light projector 3 may include two or more light sources, and each light source may be sequentially turned on. In addition, the light projector 3 may switch the light projection range R30 using a mechanism or the like that changes a light projection direction in the vertical direction Y. The grouping of the photosensors 4a of the light receiver 4 may be appropriately changed depending on how the light projection range R30 is switched by the light projector 3.

In addition, the detector 5 of the light detection device 1 includes the TDC 52 in each of the above embodiments, but the detector 5 is not necessarily provided. The detector 5 can detect various kinds of light exceeding the threshold based on the comparison result of the comparator 51. The light detection device 1 may be used together with an externally configured TDC, or may be used in a configuration that adopts an ADC instead of the TDC.

In addition, the example in which the light detection device 1 includes the ADC 11 and the DAC 12 that constitute the threshold setting module and the controller 10 operates as the threshold determiner 10a has been described in each of the above embodiments. The light detection device 1 of the present embodiment is not limited thereto, and for example, an analog circuit or the like that implements the operation of the threshold setting module may be provided instead of the ADC 11 and the DAC 12.

In addition, the lidar device 2 and the light detection device 1 that use the optical scanner 21 have been described in each of the above embodiments, but the optical scanner 21 may be omitted as appropriate. For example, when the light sources of the light projector 3 and the photosensors 4a of the light receiver 4 are arranged in a two-dimensional array form, the distance measurement and the ambient light detection similar to those in the first embodiment can be performed without using the optical scanner 21.

In addition, the light detection device 1 uses the detection result of ambient light for setting of the threshold of the detector 5 in each of the above embodiments. The light detection device 1 of the present embodiment may perform imaging of an external environment using the detection result of ambient light. For example, the controller 10 may generate a captured image of the external environment based on a light reception signal from the ADC 11.

In addition, the example in which the distance calculator 10b generates the distance image has been described in each of the above embodiments. Without being limited to the distance image, the distance calculator 10b of the present embodiment may generate information indicating a distance in various formats, for example, may generate three-dimensional point cloud data.

In addition, the example in which the controller 10 of the light detection device 1 in the lidar device 2 operates as the distance calculator 10b has been described in each of the above embodiments. In the lidar device 2 of the present embodiment, the distance calculator 10b may be provided separately from the light detection device 1.

In addition, the configuration example of the lidar device 2 and the light detection device 1 for in-vehicle applications have been described in each of the above embodiments. The lidar device 2 and the light detection device 1 according to the present disclosure are applicable not only to the in-vehicle applications but also to various applications.

APPENDIX

As described above, various embodiments of the present disclosure have been described, but the present disclosure is not limited to the above contents, and various modifications can be made within a range where the technical idea is substantially the same. Hereinafter, various aspects according to the present disclosure will be additionally described.

A first aspect according to the present disclosure is a light detection device (1) including a light projector (3), a light receiver (4), a detector (5), and a controller (10). The light projector projects light to a predetermined range (R30). The light receiver has a light receiving region (R1) in which light is received. The detector detects light by comparing a light reception result by the light receiver with a predetermined threshold. The controller controls the threshold. The controller shifts in turn a range where light is projected from the light projector (S6), causes the detector to detect light per a portion of the light receiving region, the portion corresponding to a range with light being projected from the light projector (S7 and S8), and sets the threshold based on a light reception result by the light receiver in a different portion of the light receiving region from the portion corresponding to the range with light being projected (S9 and S10).

As a second aspect, in the light detection device of the first aspect, the controller sets the threshold based on a light reception result at a portion of the light receiving region corresponding to a range where light is in next turn to be projected from the light projector.

As a third aspect, in the light detection device according to the first or second aspect, the light projector includes a plurality of light sources (31 to 34) arrayed in a row. The controller shifts the range where light is projected by causing the light sources to emit light in turn.

As a fourth aspect, the light detection device of the third aspect further includes an optical scanner (21) that scans the light projected by the light projector in a direction crossing a direction in which the light sources are arrayed. The controller causes the detector to detect light during the scanning by the optical scanner.

As a fifth aspect, in the light detection device according to the third or fourth aspect, the light receiver includes a plurality of photosensors (4a) forming the light receiving region. The controller causes the detector to detect light per a set of the photosensors corresponding, among the plurality of the photosensors, to a range where light is projected from each light source in the light projector.

As a sixth aspect, in the light detection device according to any one of the first to fifth aspects, the detector includes a time measurement circuit (52) that measures a period from a timing at which the light projector projects light to a timing at which light is detected based on the threshold.

A seventh aspect is a lidar device including the light detection device according to any one of the first to sixth aspects and a distance calculator (10b). The distance calculator calculates a distance through which detected light passes based on a light detection result of the light detection device.

An eighth aspect is a light detection method by which a light detection device (1) detects light, the light detection device (1) including a light projector (3) that projects light to a predetermined range (R30) and a light receiver (4) that has a light receiving region (R1) in which light is received. This method includes: shifting in turn a range where light is projected from the light projector (S6); detecting light by comparing a light reception result by the light receiver with a predetermined threshold per a portion of the light receiving region, the portion corresponding to a range with light being projected from the light projector (S7 and S8); and setting the threshold based on a light reception result by the light receiver in a different portion of the light receiving region from the portion corresponding to the range with light being projected (S9 and S10).

REFERENCE SIGNS LIST 1 light detection device
10 controller
2 lidar device
21 optical scanner
3 light projector
31, 34 first to fourth light sources
4 light receiver
4a photosensor
5 detector
52 TDC

The invention claimed is:

1. A light detection method by which a light detection device detects light, the light detection device comprising a light projector configured to project light to a predetermined range and a light receiver having a light receiving region in which light is received, the method including:
   shifting in turn a range where light is projected from the light projector;
   detecting light by comparing a light reception result by the light receiver with a predetermined threshold per a portion of the light receiving region, the portion corresponding to a range with light being projected from the light projector; and
   setting the threshold based on a light reception result by the light receiver in a different portion of the light receiving region from the portion corresponding to the range with light being projected,
   wherein
      the threshold is set based on a light reception result at a portion of the light receiving region corresponding to a range where light is in next turn to be projected from the light projector.

2. A light detection device comprising:
   a light projector configured to project light to a predetermined range;
   a light receiver having a light receiving region in which light is received;
   a detector configured to detect light by comparing a light reception result by the light receiver with a predetermined threshold; and
   a controller configured to control the threshold, wherein the controller is configured to:
shift in turn a range where light is projected from the light projector,
cause the detector to detect light per a portion of the light receiving region, the portion corresponding to a range with light being projected from the light projector, and
set the threshold based on a light reception result by the light receiver in a different portion of the light receiving region from the portion corresponding to the range with light being projected,
wherein the controller is configured to set the threshold based on a light reception result at a portion of the light receiving region corresponding to a range where light is in next turn to be projected from the light projector.

3. The light detection device according to claim 2, wherein
the controller is configured to cause the detector to detect light by using the set threshold, at the turn when the range where light is projected from the light projector is corresponding to a portion, which has the set threshold, of the light receiving region.

4. The light detection device according to claim 2,
wherein the light projector includes a plurality of light sources arrayed in a row, and
wherein the controller is configured to shift the range where light is projected by causing the light sources to emit light in turn.

5. The light detection device according to claim 4,
further comprising an optical scanner configured to scan the light projected by the light projector in a direction crossing a direction in which the light sources are arrayed,
wherein the controller causes the detector to detect light during the scanning by the optical scanner.

6. The light detection device according to claim 4,
wherein the light receiver includes a plurality of photosensors forming the light receiving region, and
wherein the controller is configured to cause the detector to detect light per a set of the photosensors corresponding, among the plurality of the photosensors, to a range where light is projected from each light source in the light projector.

7. The light detection device according to claim 2, wherein the detector includes a time measurement circuit configured to measure a period from a timing at which the light projector projects light to a timing at which light is detected based on the threshold.

8. A lidar device comprising:
the light detection device according to claim 2; and
a distance calculator configured to calculate a distance through which detected light passes based on a light detection result of the light detection device.

* * * * *